Feb. 23, 1926.
R. F. LAURENCE
VALVE OPERATING DEVICE
Original Filed May 4, 1923  2 Sheets-Sheet 1
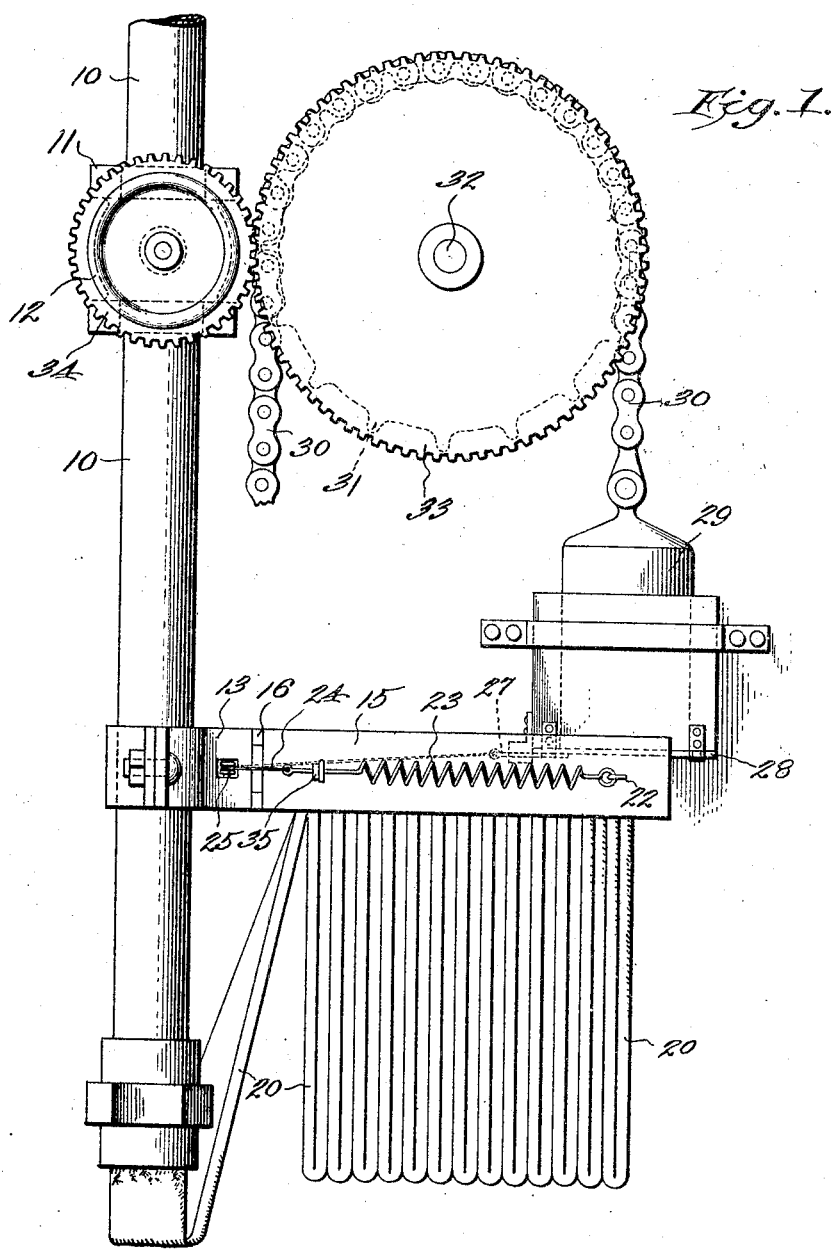

Feb. 23, 1926.
R. F. LAURENCE
VALVE OPERATING DEVICE
Original Filed May 4, 1923   2 Sheets-Sheet 2
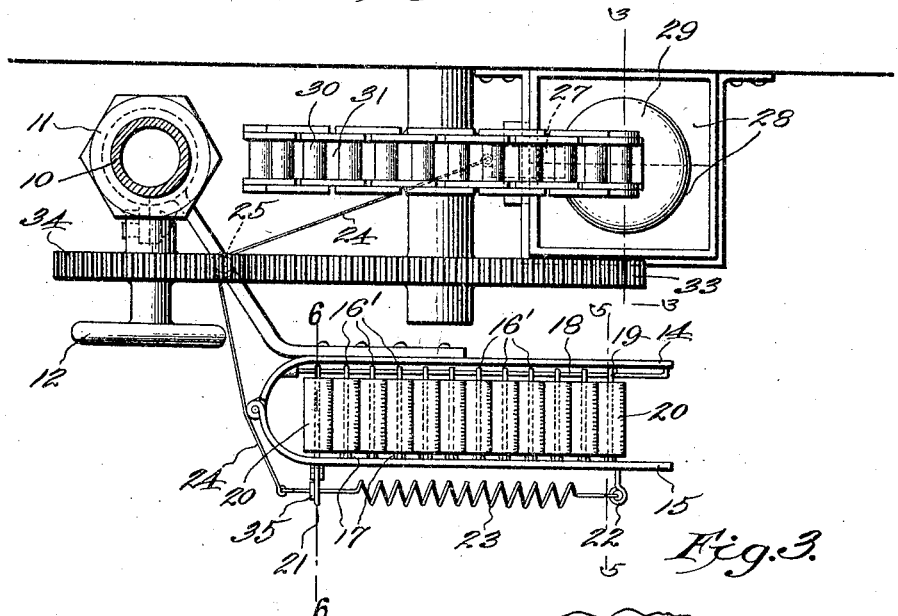
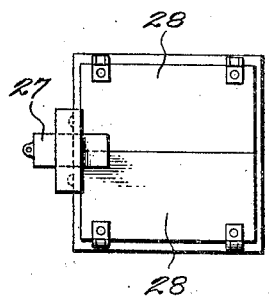
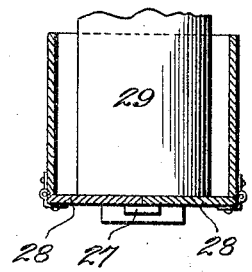
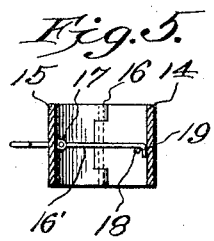
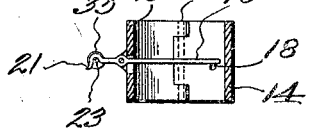
R. F. Laurence,
INVENTOR

Patented Feb. 23, 1926.

1,574,661

UNITED STATES PATENT OFFICE.

REUBEN FREDERIC LAURENCE, OF MINNEAPOLIS, MINNESOTA.

VALVE-OPERATING DEVICE.

Application filed May 4, 1923, Serial No. 636,742. Renewed October 19, 1925.

*To all whom it may concern:*

Be it known that I, REUBEN F. LAURENCE, a citizen of the United States, residing at Minneapolis, in the county of Hennepin and State of Minnesota, have invented new and useful Improvements in Valve-Operating Devices, of which the following is a specification.

This invention relates to valve operating mechanisms and has for an object the provision of means for automatically opening a valve, the invention being especially useful in a water supply system to which is connected a fire extinguishing apparatus.

An object of the invention is the provision of means associated with a hose supporting device which will control the supply of water to the hose, the invention including means whereby, when the hose is removed for use, the valve will be automatically opened to permit of a flow of water through the hose.

With the above and other objects in view, the invention further includes the following novel features and details of construction, to be hereinafter more fully described, illustrated in the accompanying drawings and pointed out in the appended claims.

In the drawings:—

Figure 1 is an elevation showing a fragmentary portion of a supply pipe and a hose supporting device and illustrating the invention in connection therewith.

Figure 2 is a top plan view of the same with the pipe in section.

Figure 3 is a section on the line 3—3 of Figure 2.

Figure 4 is an enlarged fragmentary elevation of the lower end of the weight supporting device.

Figure 5 is an enlarged section on the line 5—5 of Figure 2.

Figure 6 is an enlarged section on the line 6—6 of Figure 2.

Referring in detail to the drawings, wherein like characters of reference denote corresponding parts, the reference character 10 indicates a portion of a water supply pipe in which there is included a valve 11. This valve may have its stem provided with a hand wheel 12 for operation in the usual manner.

It is the present practice to provide hose supporting means arranged in convenient position and the said means are preferably of a character to permit of a quick attachment of the hose so that the latter may be readily brought into use. The means shown in the present instance comprises a bracket 13 which has extending therefrom spaced parallel side bars 14 and 15, the last mentioned bar being hingedly secured as at 16 so as to permit of outward swinging movement. The bar 15 has secured thereto at spaced intervals, supporting arms 16' having one of their ends secured to eyes 17 or similar securing devices so as to move with the bar 15 and be permitted a downward swinging movement. The opposite ends of the arms 16' are supported upon a rod 18 which is carried by the bar 14, the outermost arm 16' being provided at its free end with a hook 19 for engagement over the rod 18 so that the bar 15 may be held against swinging movement. The hose which is indicated at 20 is folded over the arms 16' and normally occupies the position shown in the drawings. When it is desired to use the hose, the hook 19 is detached from the rod 18 and the bar 15 swung outward so that the arms 16' will be disengaged from the rod 18 and the said arms will fall downward to permit the hose to drop.

The innermost arm 16' extends through the bar 15 as shown at 21 and is so attached to the said bar 15 as to be permitted a downward swinging movement at the inner end and an upward movement at the outer end 21.

Secured upon the outside of the bar 15 as shown at 22, is one end of a coiled spring 23. The opposite end of this spring is connected to a chain or other flexible member 24 and passes over a guide pulley 25. The opposite end of the chain 24 is secured to a latch bar 27 which serves to hold in closed position a pair of hinged supporting members 28, which supporting members act to support a weight 29.

Secured to the weight 29 is one end of a sprocket chain 30, which is trained over or around a sprocket wheel 31, mounted for rotation upon a shaft 32. Also mounted upon the shaft 32 and secured to the sprocket wheel 31 is a gear 33 which engages a pinion 34 secured upon the stem of the valve 11.

The action of the spring 23 is such as to withdraw the latch 27 and release the hinged supporting members 28 so as to permit the weight to fall, but this spring is normally held under tension by means of a catch 35 which engages the extended end 21 of the innermost arm 16'. The weight is thus normally supported by the hinged members 28, but when the bar 15 is swung outward to release the hose, the weight of the latter will act to force the outer extended end 21 of the innermost bar upward and release the catch 35 so that the spring 23 will be retracted and the latch 27 withdrawn, whereupon the weight 29 will rotate the gear 33 and pinion 34 and open the valve 11.

Various other means may be employed for supporting the hose and it is not the purpose of the present application to confine the invention to the particular supporting means shown and described.

The invention is susceptible of various changes in its form, proportions and minor details of construction and the right is herein reserved to make such changes as properly fall within the scope of the appended claims.

Having described the invention what is claimed is:—

1. In a fire extinguishing apparatus, the combination with a hose supporting device and a valve for controlling a liquid extinguishing agent, of means including a weight operatively connected to the valve for opening the latter, a hingedly mounted support for the weight, a latch for holding the support against movement and means operatively connecting the latter and hose supporting device for actuating the latch to release the weight simultaneous with the removal of the hose.

2. In a fire extinguishing apparatus, the combination with a hose supporting device and a valve for controlling a liquid extinguishing agent, of means including a weight operatively connected to the valve for opening the latter, a hingedly mounted support for the weight, a latch for holding the support against movement, means including a normally tensioned spring operatively connecting the latch and hose supporting device, whereby the latch may be operated to release the weight and means operable simultaneous with the removal of the hose from the hose supporting device to release the tension of the spring to actuate the latch.

In testimony whereof I affix my signature.

REUBEN FREDERIC LAURENCE.